(12) United States Patent

Bellaccini et al.

(10) Patent No.: US 12,573,211 B2

(45) Date of Patent: Mar. 10, 2026

---

(54) SYSTEMS AND METHODS FOR MANEUVER IDENTIFICATION FROM CONDENSED REPRESENTATIONS OF VIDEO

(71) Applicant: Verizon Patent and Licensing Inc., Basking Ridge, NJ (US)

(72) Inventors: Niccolo Bellaccini, Florence (IT); Matteo Simoncini, Pistoia (IT); Andrea Benericetti, Prato (IT); Henrique Pineiro Monteagudo, Florence (IT); Francesco Sambo, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 68 days.

(21) Appl. No.: 18/155,435

(22) Filed: Jan. 17, 2023

(65) Prior Publication Data

US 2024/0242510 A1 Jul. 18, 2024

(51) Int. Cl.
| | |
|---|---|
| *G06V 20/56* | (2022.01) |
| *B60W 50/14* | (2020.01) |
| *G06T 3/40* | (2024.01) |
| *G06T 7/13* | (2017.01) |
| *G06T 7/20* | (2017.01) |

(52) U.S. Cl.
CPC ........... *G06V 20/588* (2022.01); *B60W 50/14* (2013.01); *G06T 3/40* (2013.01); *G06T 7/13* (2017.01); *G06T 7/20* (2013.01); *G06T 2207/20084* (2013.01); *G06T 2207/30256* (2013.01)

(58) Field of Classification Search
None
See application file for complete search history.

(56) References Cited

PUBLICATIONS

Kilicarslan, Mehmet. "Motion Paradigm to Detect Pedestrians and Vehicle Collision." PhD diss., Purdue University, 2018. (Year: 2018).*
Kilicarslan M, Temel T. Motion-aware vehicle detection in driving videos. Turkish Journal of Electrical Engineering and Computer Sciences. 2022;30(1):63-78. (Year: 2022).*
Takahashi, Ryo, Takashi Matsubara, and Kuniaki Uehara. "Ricap: Random image cropping and patching data augmentation for deep cnns." In Asian conference on machine learning, pp. 786-798. PMLR, 2018. (Year: 2018).*

(Continued)

*Primary Examiner* — Clifford Hilaire

(57) ABSTRACT

In some implementations, a video system may receive, from a camera mounted to a vehicle, a video of a portion of a road on which the vehicle is traveling. The video system may extract, from each frame of a plurality of frames associated with the video of the road, a frame strip to form a plurality of frame strips, wherein each frame strip extends a predetermined width in a horizontal direction and a predetermined height in a vertical direction. The video system may form, from each frame strip, a single-pixel strip, to form a plurality of single-pixel strips. The video system may compile the plurality of single-pixel strips to form a motion profile. The video system may determine, using machine learning, one of: at least one driving maneuver associated with the vehicle based on the motion profile, or that no driving maneuvers are present in the motion profile.

18 Claims, 11 Drawing Sheets

300 ⟶

(56) References Cited

PUBLICATIONS

Cheng G, Zheng JY. Sequential semantic segmentation of road profiles for path and speed planning. IEEE Transactions on Intelligent Transportation Systems. Aug. 31, 2022;23(12):23869-82. (Year: 2022).*

Liu R, Lehman J, Molino P, Petroski Such F, Frank E, Sergeev A, Yosinski J. An intriguing failing of convolutional neural networks and the coordconv solution. Advances in neural information processing systems. 2018;31. (Year: 2018).*

Wang Z, Zheng JY, Gao Z. Detecting vehicle interactions in driving videos via motion profiles. In2020 IEEE 23rd International Conference on Intelligent Transportation Systems (ITSC) Sep. 20, 2020 (pp. 1-6). IEEE. (Year: 2020).*

* cited by examiner

105

Extract, from a video frame, a frame strip that extends a predetermined width in a horizontal direction and a predetermined height in a vertical direction

100

106

107

Form a single-
pixel strip, such
as by averaging
RGB color
values in the
vertical direction

108

100

108-1
108-2
108-3
108-4

108-n

109
Compile a plurality of single-pixel strips to thereby form a motion profile

110

100

111
Determine at least one
driving maneuver
associated with the vehicle
based on the motion profile Time

402

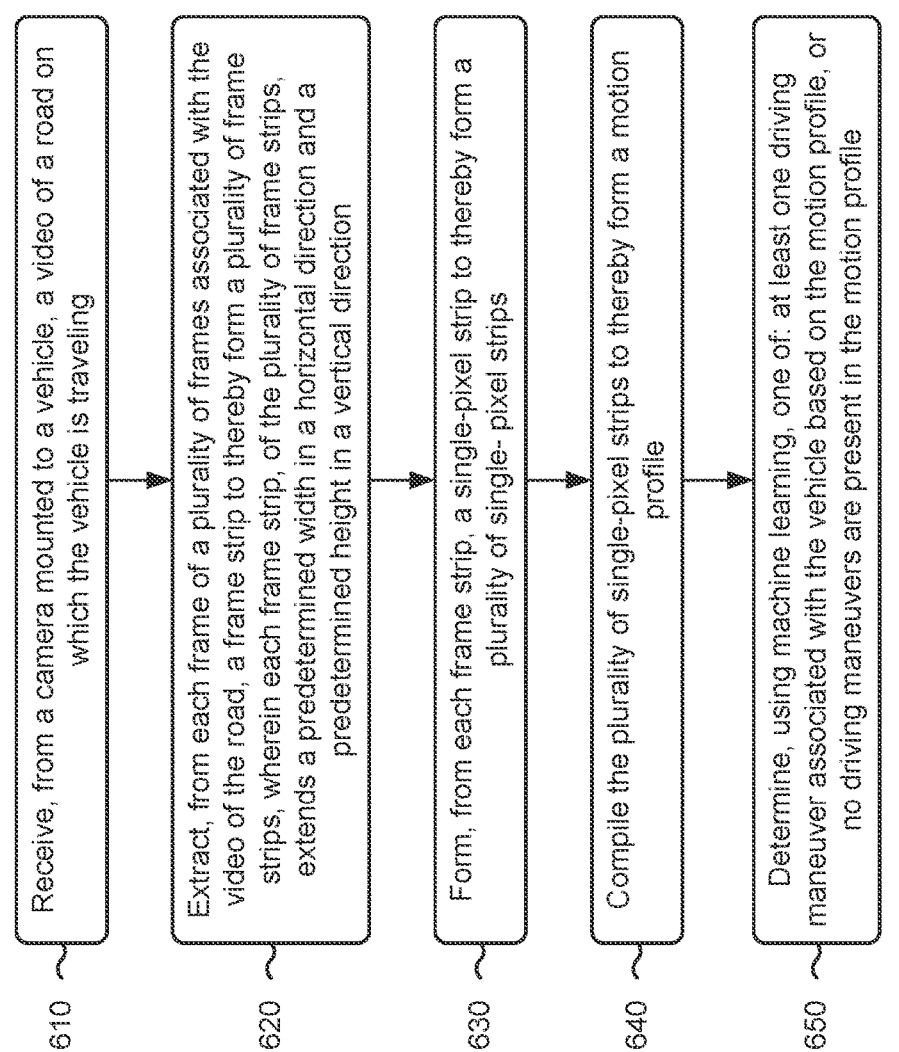

600

610 Receive, from a camera mounted to a vehicle, a video of a road on which the vehicle is traveling 620 Extract, from each frame of a plurality of frames associated with the video of the road, a frame strip to thereby form a plurality of frame strips, wherein each frame strip, of the plurality of frame strips, extends a predetermined width in a horizontal direction and a predetermined height in a vertical direction 630 Form, from each frame strip, a single-pixel strip to thereby form a plurality of single-pixel strips 640 Compile the plurality of single-pixel strips to thereby form a motion profile 650 Determine, using machine learning, one of: at least one driving maneuver associated with the vehicle based on the motion profile, or no driving maneuvers are present in the motion profile

FIG. 6

SYSTEMS AND METHODS FOR MANEUVER IDENTIFICATION FROM CONDENSED REPRESENTATIONS OF VIDEO

BACKGROUND

A dashcam is an onboard camera that continuously records images and/or video through a vehicle's front windshield or rear window. A vehicle may also include one or more integrated cameras that continuously record images and/or video associated with surroundings of the vehicle. Some dashcams and/or integrated cameras can send the images and/or video to another device wirelessly. In addition, some dashcams and/or integrated cameras gather various metrics related to a vehicle with which the dashcams and/or integrated cameras are associated, such as acceleration, deceleration, speed, steering angle, global navigation satellite systems (GNSS) data (e.g., global positioning system (GPS) data), and/or the like.

BRIEF DESCRIPTION OF THE DRAWINGS

FIG. 6 is a flowchart of an example process associated with maneuvers identification from a condensed representation of a video into an image.

DETAILED DESCRIPTION OF EXAMPLE EMBODIMENTS

Figure 1A:
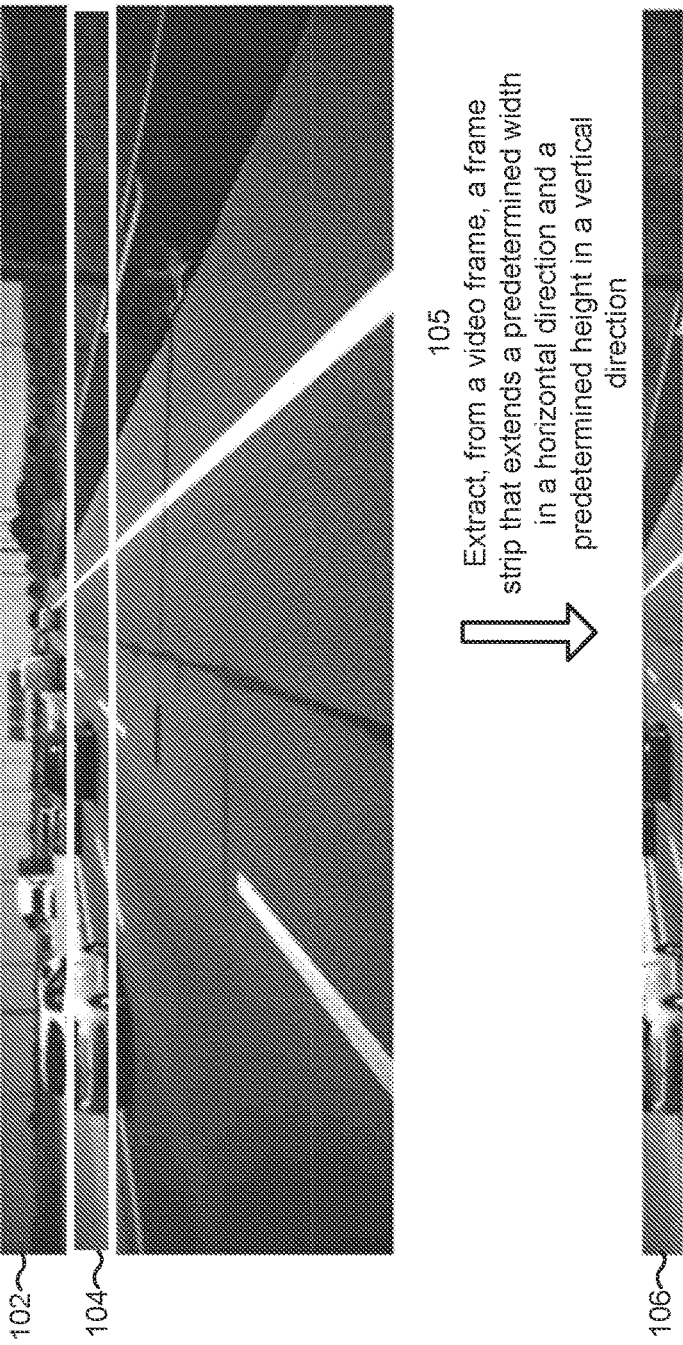
FIGS. 1A-ID are diagrams of an example process associated with maneuvers identification from a condensed representation of a video into an image.

The following detailed description of example implementations refers to the accompanying drawings. The same reference numbers in different drawings may identify the same or similar elements.

A vehicle dashcam may be installed on a vehicle and used to record images and/or video of an environment of the vehicle. For example, the dashcam may record the images and/or video continuously while the vehicle is being operated (e.g., from a time that a user of the vehicle starts an engine of the vehicle until the engine is stopped, when vehicle motion is detected, or the like). The images and/or video may be used to assess a cause of an accident involving the vehicle, to record driving behavior of an operator of the vehicle or operators of other vehicles, or for similar purposes.

In some examples, dashcams may be used as part of management of a fleet of vehicles, which may be a set of several vehicles (e.g., cars, trucks, buses, or other vehicles) used to run a business. In such examples, due to the large volume of vehicles and/or the extensive dashcam footage associated with the fleet of vehicles, it may be desirable to automate review of dashcam footage and/or to automatically detect interesting and/or noteworthy events associated with the dashcam footage without the need of going through hours of video footage. Due to the large volume of data that must be processed in automatic event detection schemes, automatic event detection schemes are typically performed at a centralized location, such as at a server or similar device remote from a dashcam and/or vehicle associated with the dashcam. This may be because the physical size limitations of the dashcam may result in limited computational capabilities and/or hardware which may overheat if required to perform automatic event detection associated with large amounts of video data. Accordingly, in order for video data from a dashcam or a similar camera to be automatically analyzed, the data may need to be uploaded to the centralized location, which may require a wireless communication link between the dashcam and a server. In cases in which no wireless communication link is available or else a wireless communication link fails, automatic event detection may not be possible in real-time. Furthermore, uploading the data to a centralized location may require high bandwidth and thus result in high wireless network resource consumption, while analyzing large amounts of video data at the centralized location may require high power, computing, and similar resource consumption, particularly when analyzing data from multiple vehicles associated with a fleet.

Some implementations described herein enable automatic event detection in a compressed representation of driving footage from a dashcam, which may be less resource-consuming than analyzing high volumes of uncompressed video data, and thus may be performed at the dashcam itself or else may reduce network resources required to upload the compressed representation for analysis at a centralized location. In some implementations, a compressed representation of the dashcam footage may be created by extracting, below a horizon in the dashcam footage (e.g., 50 pixels below a location of the horizon in the dashcam footage or a similar location within the dashcam footage) a horizontal strip from each frame of a series of video frames of dashcam footage, averaging color values of the horizontal strips vertically to form multiple single-pixel strips, and then combining and/or stacking the multiple single-pixel strips to form the compressed representation of the dashcam footage, sometimes referred to herein as a motion profile. The motion profile may then be analyzed (such as by using a machine learning algorithm) for certain patterns or artifacts, which may be indicative of driving maneuvers, such as vehicle overtakes, lane changes, or similar maneuvers. Analyzing the compressed representation of the dashcam video using machine learning or the like may result in faster and less computationally intensive event detection, resulting in reduced storage required at the dashcam, reduced power and/or computing resource consumption in performing the event detection, and/or reduced network resource consumption associated with transmitting dashcam data to a centralized location. Moreover, analyzing the compressed representation of the dashcam video using machine learning or the like may enable real-time or near real-time analysis of dashcam footage and/or real-time or near real-time driver feedback, thereby improving driver safety.

FIGS. 1A-1D are diagrams of an example process 100 associated with maneuvers identification from a condensed representation of a video into an image. The example 100 may be performed by a camera (e.g., a dashcam), a component thereof, and/or a component associated with or otherwise in communication with the camera, such as one or more of the devices and or components described below in connection with FIGS. 4A-5. The camera and/or one or more additional components described in more detail below in connection with FIGS. 4A-5 may be referred to herein as a "video system" for ease of discussion.

FIG. 1A shows an example video frame 102, such as a video frame from a video captured by a dashcam or similar camera mounted to a dashboard of a vehicle or otherwise integrated into the vehicle. The video frame 102 may include a representation of the horizon and/or a vanishing point associated with a road, the sky and/or other objects shown extending above the horizon and/or a vanishing point, and a portion of the road on which the vehicle is traveling shown below the horizon and/or vanishing point. The road may appear as if it is converging to a single point on the horizon, sometimes referred to as the vanishing point. Moreover, the road may include one or more other vehicles traveling thereon, one or more markings, such as lane lines (e.g., solid lines marking edges of a drivable surface of the road, dashed lines marking edges of a lane in which the vehicle is traveling, or similar markings), or other objects. In some implementations, the dashcam or similar camera may be configured to capture multiple video frames 102 over time, thereby forming a video (e.g., a recording of an image or of moving images) of the road on which the vehicle is traveling. More particularly, the dashcam or similar camera may be configured to capture the video frame 102 multiple times per second according to a predetermined rate (sometimes referred to as a video frame rate, which may be expressed in terms of frames per second (FPS)), with the video including each of the captured frames played in succession.

In some implementations, the video system may determine a focal area 104 within the video frame 102, which may be a horizontal strip of the video frame 102 used to analyze various maneuvers performed by the vehicle associated with the dashcam or other camera and/or other vehicles on the road. In some implementations, the focal area 104 may include a horizontal strip that extends the width of the video frame 102 in a horizontal direction (e.g., a left-to-right direction in the view shown in FIG. 1A) and a fixed number of pixels in the vertical direction (e.g., a top-to-bottom direction in the view shown in FIG. 1A). For example, the focal area 104 may be an area of the video frame 102 that extends the width of the video frame 102 and 20 pixels in the vertical direction. In some other implementations, the focal area 104 may extend more or fewer pixels in the vertical direction without departing from the scope of the disclosure. In some implementations, the focal area 104 may extend a single pixel in the vertical direction.

In some implementations, the focal area 104 may include an area below the horizon and/or may overlap with a representation of the road on which the vehicle is traveling. A distance between an upper bound of the focal area 104 and the horizon may vary according to a portion of the road that is being analyzed for a given application. For example, in implementations in which activity far from the vehicle is to be analyzed, the focal area 104 may be located relatively close to the horizon (e.g., an upper bound of the focal area 104 may be located adjacent to the horizon or else very near to the horizon). In implementations in which activity close to the vehicle is to be analyzed, the focal area 104 may be located relatively far from the horizon (e.g., an upper bound of the focal area 104 may be located far from the horizon and/or the focal area 104 may be located near a bottom portion of the video frame 102). In implementations in which activity at an intermediate distance is to be analyzed, the focal area 104 may be located somewhere between the horizon and the bottom portion of the video frame. In some implementations, the focal area 104 may be located approximately 50 pixels below a location of the horizon in the video frame.

In some implementations, the video system may determine the focal area 104 based on the vanishing point. For example, the video system may include a vanishing point detector that is capable of detecting the vanishing point, and thus a vertical location of the horizon, in the video frame 102. In such implementations, the video system may determine the focal area 104 with respect to the location of the vanishing point. For example, the video system may select an area between approximately 50 and 100 pixels below the vanishing point (and thus the horizon) to serve at the focal area 104.

As shown by reference number 105, the video system may be configured to extract, from the video frame 102, a frame strip 106, which may correspond to the focal area 104. In that regard, the frame strip 106 may extend a predetermined width in the horizontal direction (e.g., a width of the video frame 102) and a predetermined height in the vertical direction (e.g., a fixed number of pixels, such as 20 pixels or a different number of pixels). Moreover, the video system may be configured to extract multiple frame strips 106, each from a different video frame 102 over time, to thereby form multiple frame strips 106. In this regard, each of the multiple frame strips 106 may correspond to the focal area 104 of the video frame 102 at a different point in time.

Figure 1B:
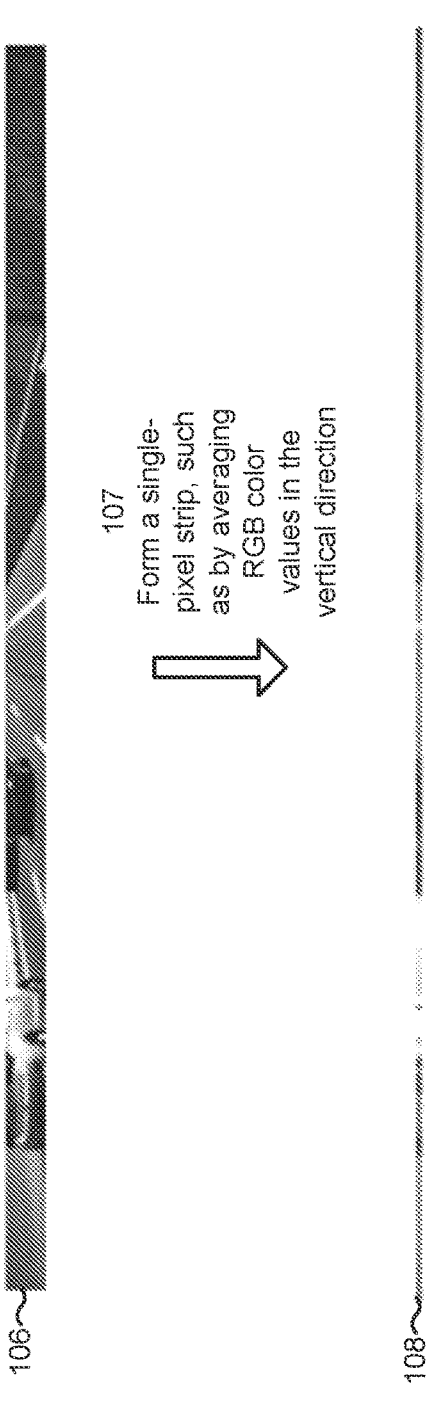
Figure 1B:

As shown in FIG. 1B, and as indicated by reference number 107, the video system may be configured to form, from each frame strip 106, a single-pixel strip 108 (sometimes referred to herein as a one-pixel-tall horizontal strip). Put another way, the video system may condense each frame strip 106, which may extend the width of the video frame 102 and/or 20 pixels in the vertical direction, to a one-pixel-tall horizontal strip, which may still extend the width of the video frame 102 but which may extend only a single pixel in the vertical direction. In some implementations, the single-pixel strip 108 may be formed by averaging color values of the frame strip 106 vertically. For example, the single-pixel strip 108 may be formed by averaging red, green, and blue (RGB) color values or other color values of the frame strip 106 vertically. In such implementations, the single-pixel strip 108 may be formed by averaging, at each of a plurality of pixel locations in the horizontal direction, RGB color values associated with pixels in the vertical direction. Thus, for frame strips 106 that extend a width of video frame 102 and are 20 pixels tall, at each pixel in the horizontal direction, the RGB values of the corresponding 20 vertical pixels may be averaged in order to form the single-pixel strip 108. More generally, in implementations in which I is an input horizontal patch of size m pixels by n pixels, the j-th component of the output vertical average $r \in R^{n \times 1}$ may be computed as $$r_j = \frac{1}{m} \sum_{i=1}^{m} I(i, j) \forall\, j = 1, \ldots, n.$$

Figure 1C:
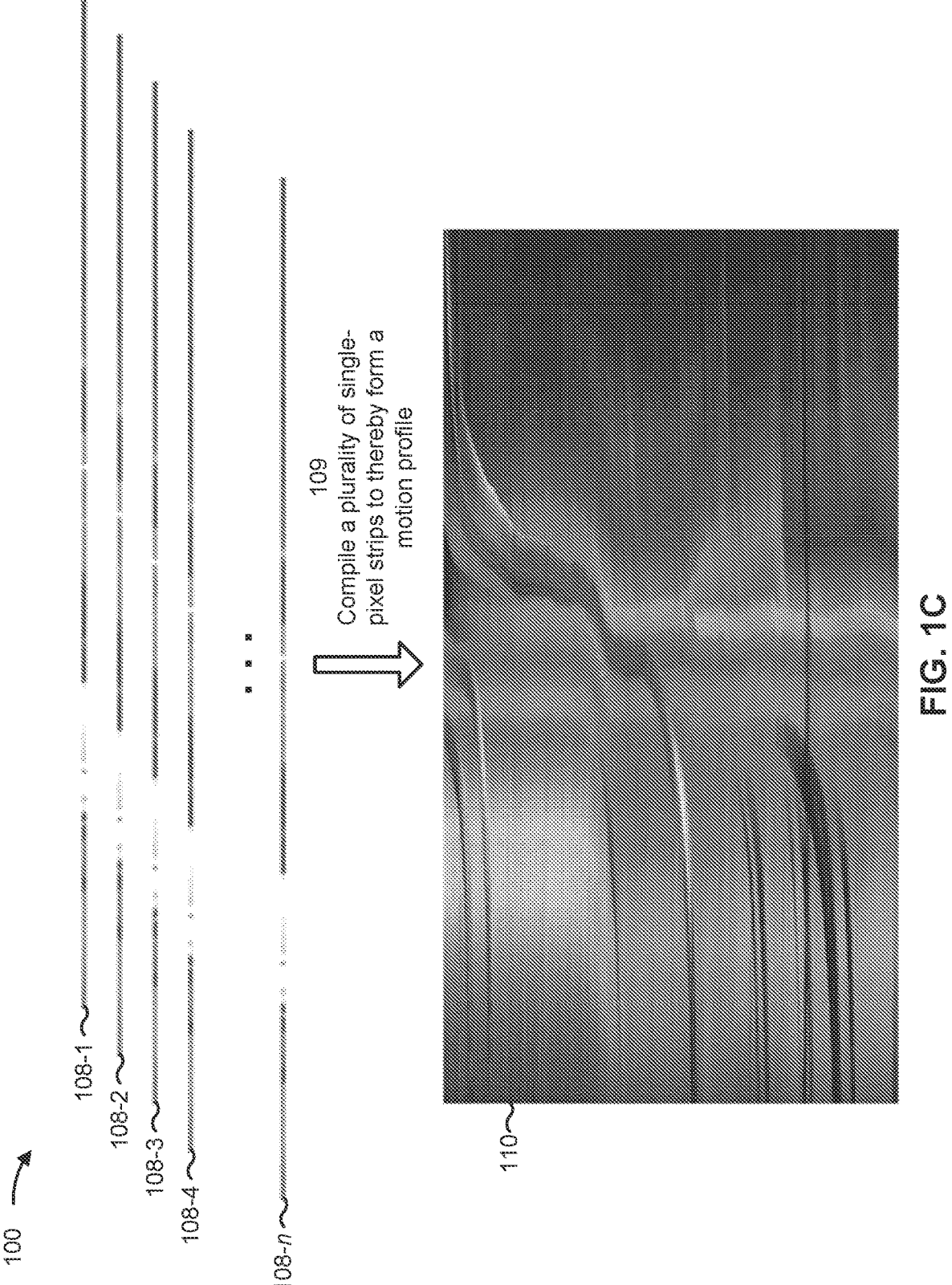

As shown in FIG. 1C, and as indicated by reference number 109, multiple single-pixel strips 108 (shown as single-pixel strip 108-1 through single-pixel strip 108-$n$) may be combined to form a motion profile 110. More particularly, multiple single-pixel strips 108 may be stacked vertically to form the motion profile 110. As described above in connection with FIG. 1A, each of the multiple frame strips 106 may correspond to the focal area 104 of the video frame 102 at a different point in time. Accordingly, each of the multiple single-pixel strips 108 may correspond to a compressed representation of the focal area 104 of the video frame 102 at a different point in time (e.g., an RGB-color-value vertically-averaged representation of the focal area 104 at different points in time). Accordingly, the motion profile 110, which may be formed by stacking the single-pixel strips 108, may be representative of the change in the RGB-color-value averaged values of the focal area 104 over time. Put another way, the video system may be configured to compile the motion profile 110, which may include multiple one-pixel-tall horizontal strips, with each one of the one-pixel-tall horizontal strips corresponding to a different video frame 102 of the video of the road. In some implementations, the motion profile 110 may be an image that is m pixels wide by p pixels tall, where m corresponds to the width of the original video resolution and p corresponds to the number of video frames 102 of the video being analyzed. In some implementations, the multiple single-pixel strips 108 may be stacked top-to-bottom to form the motion profile 110, and thus time may be represented as flowing from the top of the motion profile 110 the bottom of the motion profile 110. In some other implementations, the multiple single-pixel strips 108 may be stacked bottom-to-top to form the motion profile 110, and thus time may be represented as flowing from the bottom of the motion profile 110 the top of the motion profile 110.

In some implementations, the video system may be configured to generate the motion profile 110 on demand, such as by using a locally-saved video at the dashcam or other video device. Additionally, or alternatively, the video system may be configured to generate the motion profile 110 in real-time or near real-time, such as by creating the motion profile 110 as video is being captured by the dashcam or a similar camera. In some implementations, if the motion profile 110 is generated on demand, extracting the frame strip 106 from each video frame 102 of the video, generating the single-pixel strip 108 from each frame strip 106, and/or performing decoding for each video frame 102 of the video may be performed to generate the motion profile 110. In some other implementations, if the motion profile 110 is generated in real-time or near real-time (e.g., if a live approach is used to generate the motion profile 110), the video system may be configured to read a video stream directly from a source (e.g., a camera), compute the vertical row average (e.g., generate the single-pixel strips 108) on the fly, and attach the result to a live, expanding (in the vertical direction) motion profile 110. Additionally, or alternatively, the motion profile 110 may be configured to have a fixed height, such that, once the fixed height is reached, as the video system adds an additional single-pixel strip 108 to the motion profile 110 at the top (in a bottom-up created motion profile 110) or the bottom (in a top-down created motion profile 110), the video system may drop a single-pixel strip 108 from the bottom or the top, respectively. Put another way, for real-time or near real-time generated motion profiles 110 with a fixed height, as a new single-pixel strip 108 is added to the motion profile 110, an oldest single-pixel strip 108 of the motion profile 110 may be dropped in order to maintain the fixed height.

Certain actions of the vehicle may present certain patterns in the motion profile 110 over time. For example, another vehicle on the road directly in front of the vehicle that includes the dashcam (sometimes referred to herein as the "ego vehicle") may appear as a blob in a central portion the motion profile 110, with a size of the blob varying according to a size of the other vehicle, a distance from the ego vehicle to the other vehicle, and similar factors. Moreover, other vehicles overtaking the ego vehicle or being overtaken by the ego vehicle may appear as comma-shaped artifacts on a left side or a right side of the motion profile 110. Accordingly, in some implementations, the video system may be configured to determine, using machine learning, at least one driving maneuver associated with the ego vehicle based on the motion profile 110, and, more particularly, based on one or more patterns appearing in the motion profile 110. For example, the video system may be configured to determine from the motion profile 110 an overtake maneuver performed by another vehicle, a cut-in maneuver performed by another vehicle, a lane change maneuver performed by the ego vehicle, an overtake maneuver performed by the ego vehicle, tailgating of another vehicle by the ego vehicle, or similar maneuvers. Additionally, or alternatively, the video system may be configured to determine that no driving maneuver is present in the motion profile 110.

Figure 1D:
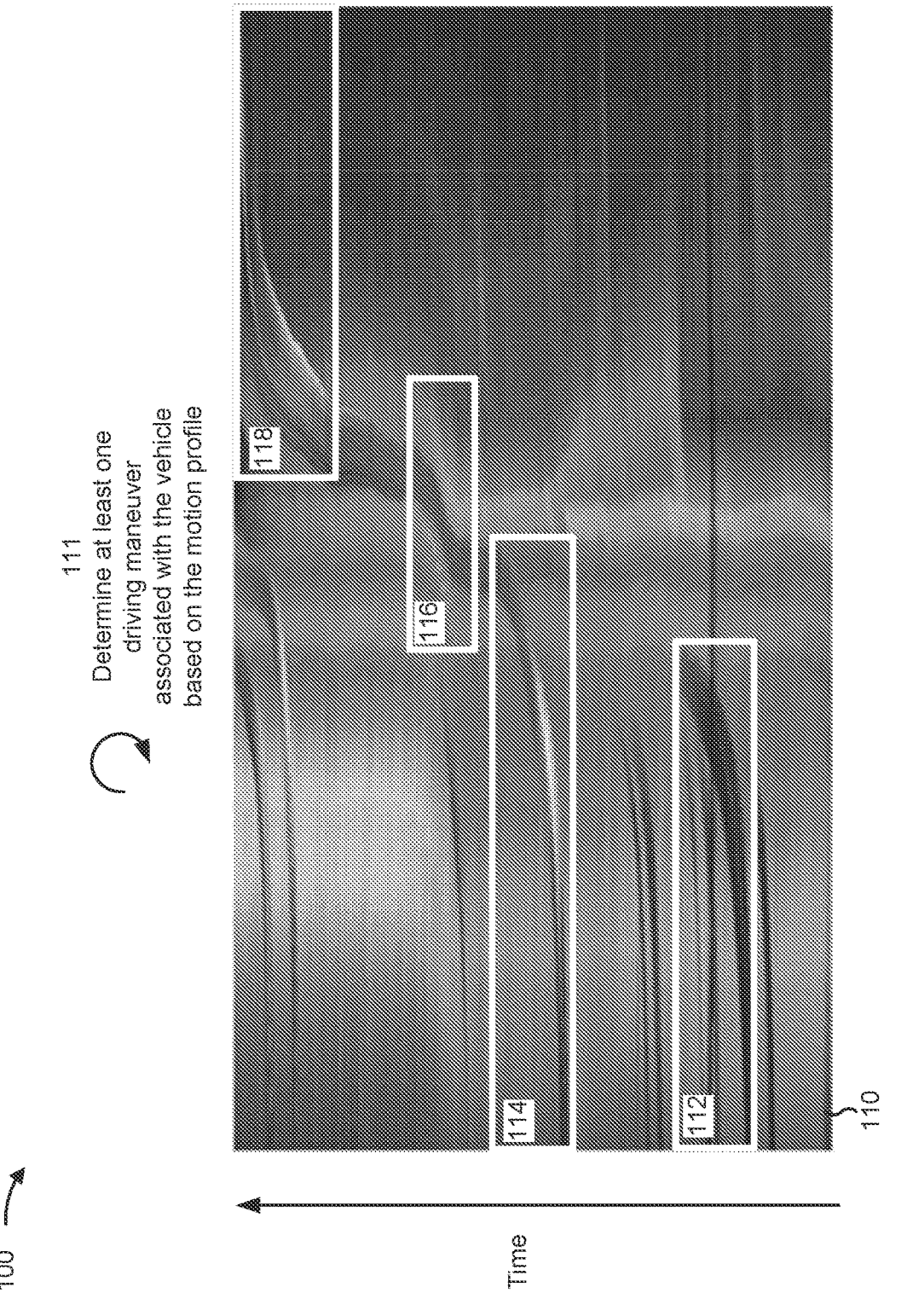

More particularly, as shown in FIG. 1D, and as indicated by reference number 111, the video system may be configured to detect certain patterns or artifacts included in the motion profile 110, which may be representative of maneuvers performed by the ego vehicle and/or other vehicles. More particularly, in this example, the motion profile 110 may have been generated by stacking the single-pixel strips 108 from a bottom up, such that a time domain flows from the bottom of the motion profile 110 to the top of the motion profile 110, as shown. Moreover, in this example, the video system may detect four different maneuvers, associated with a first artifact 112, a second artifact 114, a third artifact 116, and a fourth artifact 118. As shown, each artifact 112, 114, 116, 118 may be located in a different portion of the motion profile 110 and/or may be associated with a different shape, and thus may be indicative of a different maneuver being associated with the vehicle. In some implementations, the video system may be configured to detect the artifacts using machine learning. For example, the video system may utilize an object detection algorithm (e.g., you only look once, version 3 (YOLOv3)), a convolution neural network (CNN), and/or a similar object detection technique to detect the artifacts in the motion profile 110.

More particularly, using machine learning or similar techniques, the video system may detect the first artifact 112, the second artifact 114, the third artifact 116, and the fourth artifact. The first artifact 112 appears as a whisker formed on a left portion of the motion profile 110. More particularly, the first artifact 112 is a generally comma-shaped whisker having a curved profile originating at a left edge of the motion profile 110 and extending toward the top, center of the motion profile 110. In some implementations, the first artifact 112 may correspond to an overtake performed by another vehicle to the left of the ego vehicle. Put another way, the shape and location of the first artifact 112 may be indicative that another vehicle passed the ego vehicle on a left side of the ego vehicle. Similarly, an overtake performed on a right of the ego vehicle may be indicated by an artifact provided on the right side of the motion profile 110 that is a mirror image of the first artifact 112 (e.g., a comma-shaped whisker originating from a right edge of the motion profile 110 having a curved profile extending towards the top, center of the motion profile 110).

The second artifact 114 appears as a whisker formed on a left portion of the motion profile 110, having a generally comma-shaped profile originating from a left edge of the motion profile 110 and extending toward the top, center of the motion profile 110. In that regard, the second artifact 114 may be associated with a similar location and shape as the first artifact 112. However, the second artifact 114 may be wider, with a curved, distal end thereof ending in a middle of the motion profile 110, indicative that the overtaking vehicle ended up directly in front of the ego vehicle. In that regard, the second artifact 114 may be associated with a cut-in maneuver performed by the other vehicle to the left of the ego vehicle, which may include an overtake of the ego vehicle by the other vehicle to the left followed by a lane change of the other vehicle to the right in order to move into the same lane as the ego-vehicle. Similarly, a cut-in maneuver performed on a right of the ego vehicle may be indicated by an artifact provided on the right side of the motion profile 110 that is a mirror image of the second artifact 114 (e.g., a comma-shaped whisker on the right of the motion profile 110 having a curved profile originating from a right edge of the motion profile 110 and extending toward the top, center of the motion profile 110 and ending in a middle of the motion profile 110).

The third artifact 116 appears as a horizontal shift of a spot originating in a center of the motion profile 110 toward a right of the motion profile 110. This may be indicative of a lane change of the ego vehicle to the left, with another vehicle that originated directly in front of the ego vehicle, and thus appearing as a spot in the center of the motion profile 110, being horizontally shifted to the right of the motion profile 110 when the ego vehicle performs the lane change. Similarly, a lane change of the ego vehicle to the right may be indicated by a mirror image of the third artifact 116 (e.g., a horizontal shift of a spot originating in a center of the motion profile 110 toward a left of the motion profile 110).

The fourth artifact 118 appears as a whisker formed on a right portion of the motion profile 110, having a generally inverted (with respect to the profiles described above in connection with the first artifact 112 and the second artifact 114) comma-shaped profile originating near a center of the motion profile 110 and extending upward and toward a right edge of the motion profile 110. In that regard, the fourth artifact 118 may be indicative of the ego vehicle overtaking another vehicle on the left. Similarly, the ego vehicle overtaking another vehicle on the right may be indicated by an artifact provided on the left side of the motion profile 110 that is a mirror image of the fourth artifact 118 (e.g., an inverted comma-shaped whisker on the left of the motion profile 110 having a curved profile originating near a center of the motion profile 110 and extending upward and toward the left edge of the motion profile 110).

The video system may be configured to determine other artifacts and/or maneuvers based on the motion profile 110. For example, the video system may be configured to determine that the ego vehicle is tailgating another vehicle (e.g., directly following another vehicle with a relatively short following distance) based on an artifact appearing as a blob-shaped artifact in the middle of the motion profile 110. Additionally, or alternatively, the video system may be configured to determine a sharpness of a lane change based on an artifact in the motion profile 110. For example, when traveling at a fixed speed, a relatively short, in the vertical direction, lane-change artifact may indicate a harsh and/or a rapid swerve maneuver, while a relatively long, in the vertical direction, lane-change artifact may indicate a gentle and/or gradual lane change maneuver.

In some implementations, the maneuvers (and thus artifacts) may occur anywhere in time (e.g., the vertical dimension of the motion profile 110) but may be bounded to specific places in space (e.g., the horizontal dimension of the motion profile 110). For example, a lane change artifact associated with a lane change to the left may always start from the central part of the motion profile 110 and slightly deviate to the right (as the vanishing point moves to the left), while an artifact associated with an overtake to the left of another vehicle may always be associated with a whisker to the right side of the motion profile 110. However, all maneuvers may present strong inter-class variations, such that an overtake may be distinguished from a lane change, and so forth.

In some implementations, a shape of a particular artifact may vary according to a duration in time of the maneuver itself, with longer maneuvers resulting in artifacts appearing taller in the vertical direction. In some other implementations, a shape of a particular artifact may vary according to a speed of the ego vehicle and/or a relative speed of the ego vehicle with respect to other vehicles. For example, in implementations employing a fixed video frame rate for the dashcam or similar camera, ego vehicles traveling at higher speeds may result in shorter artifacts in the vertical direction (e.g., other entities appear for less time inside the recorded scene). In some implementations, a shape of a particular artifact may vary according to an amount of horizontal movement of the ego vehicle or other vehicles. For example, a width of an overtake artifact and/or a lane change artifact may vary according to a horizontal movement of the ego vehicle and/or other vehicles during such movements. Additionally, or alternatively, a shape of a particular artifact may vary according to a presence of other entities in the captured scene, such as whether another vehicle is on the road in front of the ego vehicle, whether the scene includes many background still objects or other objects, or how much traffic is on the road, among other factors.

Moreover, in some other implementations, a shape of a particular artifact may vary according to a height of the frame strip 106 that is averaged vertically to produce the single-pixel strip 108 used to generate the motion profile 110. For example, in implementations in which a relatively tall frame strip 106 is used (e.g., greater than 20 pixels in the vertical direction), the frame strip 106 may correspond to a relatively large portion of the road ahead. In such implementations, many pixels may be averaged when forming the single-pixel strip 108, resulting in a motion profile 110 that may appear blurry. On the other hand, in implementations in which a relatively short frame strip 106 is used (e.g., less than 20 pixels in the vertical direction, up to the extreme case of a one-pixel high frame strip 106 in which no averaging operation is performed to result in the single-pixel strip 108), the frame strip 106 may correspond to a relatively short portion of the road ahead. In such implementations, a relatively low amount of pixels may be averaged when the single-pixel strip 108 is formed, resulting in a motion profile 110 that may appear crisp but which may contain fewer artifacts due to the relatively small area of the road being represented.

In some implementations, the video system may be configured to provide driver feedback based on determining the at least one driving maneuver, such as by providing audio and/or visual feedback via a user interface associated with the dashcam vehicle system. For example, the video system may provide feedback to the driver indicating that the driver is driving relatively dangerously in response to determining that the ego vehicle is traveling at a high rate of speed, is performing overtakes to a right of other vehicles (in a country in which drivers drive on the right-hand side of the road), is frequently or rapidly changing lanes, or similar maneuvers. This may prompt the driver to change the driver's driving patterns, thereby improving safety. Similarly, in response to determining that the ego vehicle is traveling at normal rate of speed, is not performing many vehicle overtakes and/or only overtaking vehicles to the left (in a right-hand driving country), does not frequently change lanes and/or performs gradual lane changes, or similar maneuvers, the video system may provide positive feedback to the driver such that the driver may maintain safe driving habits.

As indicated above, FIGS. 1A-1D are provided as an example. Other examples may differ from what is described with regard to FIGS. 1A-1D.

Figure 2A:
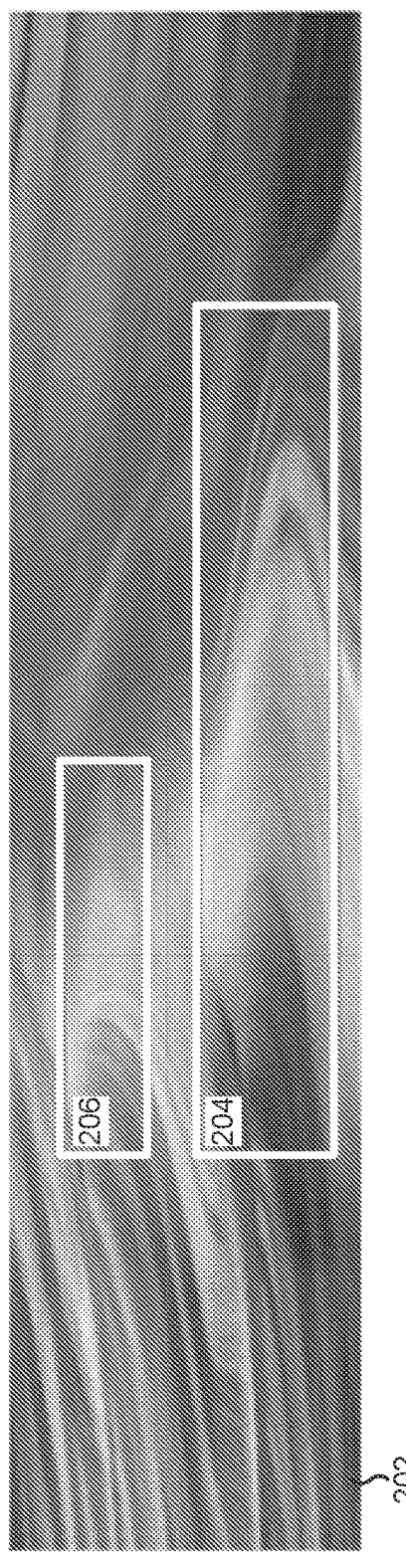
FIGS. 2A-2B are diagrams of another example process associated with maneuvers identification from a condensed representation of a video into an image.
Figure 2B:
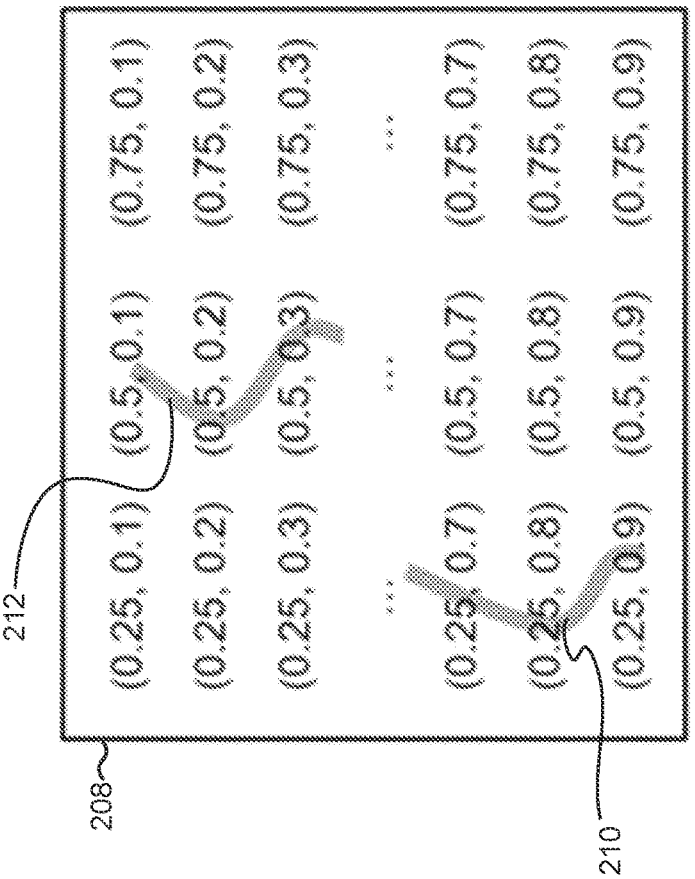

FIGS. 2A-2B are diagrams of another example process 200 associated with maneuvers identification from a condensed representation of a video into an image. The example 200 may be associated with a camera (e.g., a dashcam), a component thereof, and/or a component associated with or otherwise in communication with the camera, such as one or more of the devices and or components described below in connection with FIGS. 4A-5.

In some implementations, the video system may utilize machine learning, artificial intelligence, or similar techniques to determine multiple patterns of a motion profile that are associated with multiple driving maneuvers. More particularly, the video system may be associated with a deep learning algorithm or similar algorithm that uses object detection techniques or similar techniques to detect patterns in the motion profile associated with certain driving maneuvers such as ego vehicle lane change maneuvers, ego vehicle overtaking maneuvers, other vehicle overtaking maneuvers, other vehicle cut-in maneuvers, or similar maneuvers.

More particularly, FIG. 2A shows an example motion profile 202 including a first artifact 204 and a second artifact 206. In some implementations, both the first artifact 204 and the second artifact 206 may be associated with a lane change of an ego vehicle to the left. However, due to variations in speed, environmental factors, or other variations, the artifacts 204, 206 may appear as different shapes (e.g., the artifacts may appear with different horizontal and vertical dimensions). Nonetheless, the video system may be configured to recognize both artifacts 204, 206 as lane changes to the left via object detection techniques or other machine learning techniques, such as by utilizing an object detection algorithm (e.g., you only look once, version 3 (YOLOv3)), a convolution neural network (CNN), and/or a similar object detection technique. In some implementations, one or more data augmentation techniques may be implemented to improve detection capabilities of a machine learning algorithm during a training phase of the machine learning algorithm, such as one or more of random color jittering of the motion profile 202, vertical random cropping of the motion profile 202, random resizing of the motion profile 202, or random horizontal flipping of the motion profile 202. In implementations involving random horizontal flipping of the motion profile 202, a class of a recognized maneuver may be adjusted accordingly (e.g., a right lane change would appear as a left lane change in the flipped image, a vehicle to the left of the ego vehicle would appear to the right of the ego vehicle in the flipped image, or the like). In some implementations, this may result in determining certain patterns that are associated with certain maneuvers, notwithstanding a variance in the patterns' size, location, or similar features.

In some implementations, a position of an artifact (e.g., to the right of the motion profile 202, to the left of the motion profile 202, within a center of the motion profile 202, or a similar position) may be associated with a type of maneuver being performed, as described above in detail in connection with FIG. 1D. Accordingly, in some implementations, an algorithm used to detect an artifact and/or maneuver in the motion profile 202 may employ a convolution operation associated with a coordinate convolution layer (sometimes referred to as "CoordConv Layer"). In some implementations, the coordinate convolution layer may be representative of the x and y coordinates across an input tensor. Put another way, during an object detection process, a convolution process, or a similar machine learning process, a three-channel image (e.g., an RGB image) may be supplemented with a number representing the position of the artifact in the image, normalized in [0,1], in order to provide information about an area of the video frame in which the artifact originated, which may be indicative of the type of maneuver that was being performed.

More particularly, FIG. 2B shows a representation of a motion profile 208 with convolution coordinates overlaid thereon (normalized to [0, 1]), indicating various positions of artifacts of the motion profile 208. In this example, the motion profile 208 includes two artifacts, including a first artifact 210 and a second artifact 212. As shown, the first artifact 210 and the second artifact 212 may include a substantially similar shape, and thus traditional object detection techniques (e.g., YOLOv3 or a similar CNN technique) may not distinguish between the two artifacts. Put another way, traditional object detection techniques may recognize the first artifact 210 and the second artifact 212 as the same artifact, leading to an erroneous maneuver detection for at least one of the artifacts 210, 212. More particularly, as described above in connection with FIG. 1D, these artifacts may represent two distinct maneuvers due to their relative position in the motion profile 208. For example, the first artifact 210, which is disposed on a left portion of the motion profile 208, may be associated with an overtake maneuver, and the second artifact 212, which is disposed near a center of the motion profile 208, may be associated with a lane change maneuver.

In this regard, determining a maneuver associated with each artifact 210, 212 may be based on coordinate convolution layer information associated with each artifact. For example, a pixel belonging to the second artifact 212 may be associated with a pair of numbers (e.g., 0.50 and 0.25) indicating that the event occurred in the central part of the video frame 102 and at one-quarter of the temporal resolution of the whole event. Accordingly, because the maneuver occurred in the central portion of the video frame, the video system may determine that the second artifact 212 is associated with a lane change maneuver. The similarly-shaped first artifact 210 may include a pixel associated with the coordinates 0.3 and 0.8, indicating that the event occurred in the left part of the video frame and at four-fifths of the temporal resolution of the whole event. Accordingly, because the maneuver occurred in the left portion of the video frame, the video system may distinguish the maneuver associated with the first artifact 210 from the maneuver associated with the second artifact 212 (e.g., a lane change maneuver), such as by identifying the maneuver as being associated with an overtake maneuver.

Figure 3:
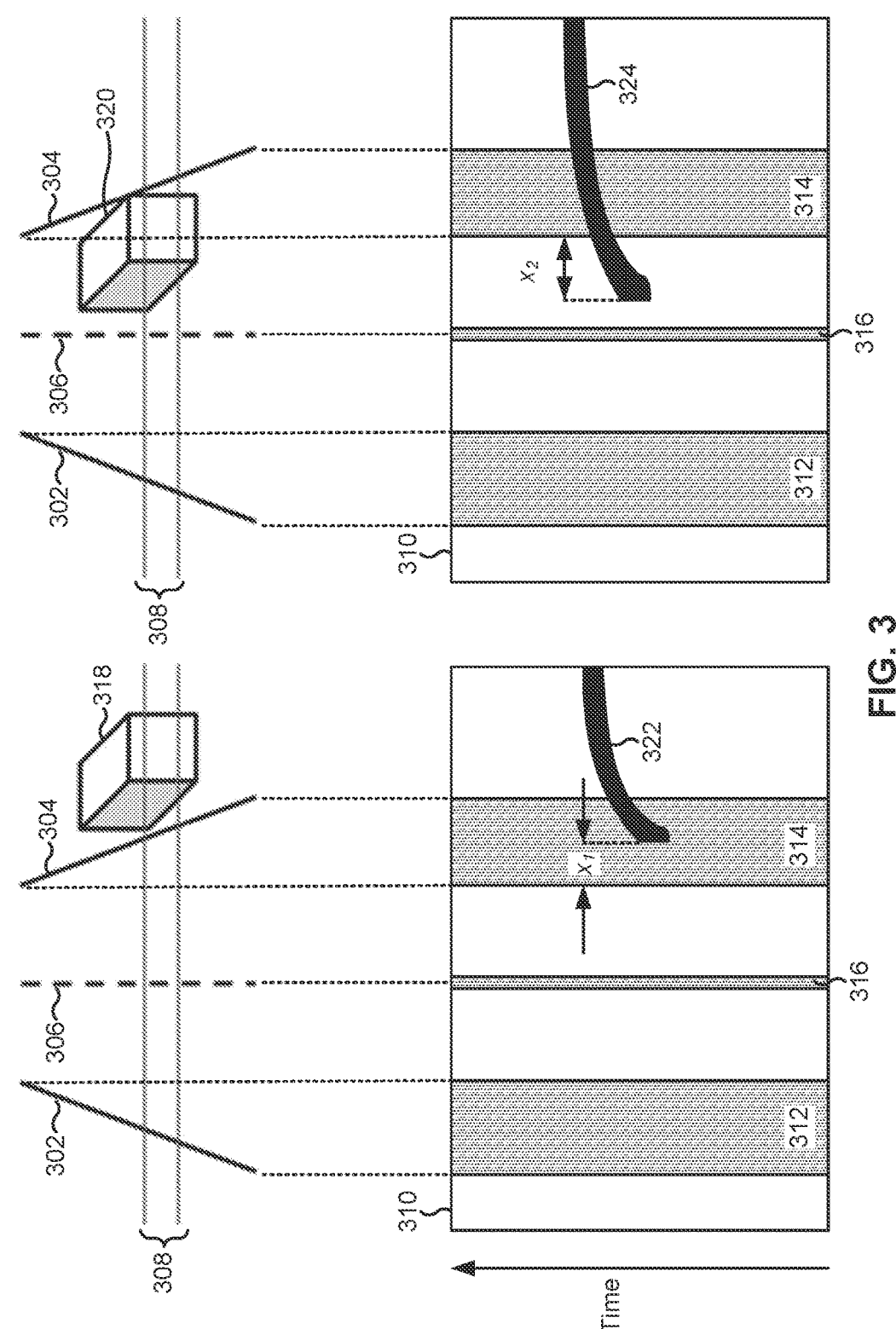
FIG. 3 is a diagram of another example process associated with maneuvers identification from a condensed representation of a video into an image.

As indicated above, FIGS. 2A-2B are provided as an example. Other examples may differ from what is described with regard to FIGS. 2A-2B FIG. 3 is a diagram of another example 300 associated with maneuvers identification from a condensed representation of a video into an image. The example 300 may be performed by a camera (e.g., a dashcam), a component thereof, and/or a component associated with or otherwise in communication with the camera, such as one or more of the devices and or components described below in connection with FIGS. 4A-5.

In some implementations, the video system may be configured to distinguish between artifacts corresponding to parked vehicles and artifacts corresponding to moving vehicles. For example, when an ego vehicle overtakes a parked vehicle at a relatively high speed, there may be little safety concern, but when an ego vehicle overtakes a moving vehicle at a relatively high speed, this may be indicative of dangerous driving. Accordingly, in some implementations, the video system may be configured to determine one or more locations of the motion profile that are associated with one or more edges of the road, and thus determine one or more driving maneuvers based on the edges of the road. More particularly, artifacts that are provided in the motion profile within one or more locations of the motion profile that are associated with one or more edges of the road may be associated with parked vehicles or other stationary objects, while artifacts that cross the one or more locations of the motion profile that are associated with one or more edges of the road may be associated with moving vehicles.

As shown in FIG. 3, in some implementations, the video system may be configured to recognize lane lines and/or road edges in a video frame (e.g., video frame 102) or other image, such as a first road edge 302, a second road edge 304, a lane line 306, or similar line or edge. For example, the video system may be configured to recognize the first road edge 302, the second road edge 304, the lane line 306, or a similar line or edge by employing a semantic segmentation algorithm to detect each pixel belonging to a lane in the video frame, along with the class of the lane (e.g., dashed, solid, road edge, or a similar class). The video system may then compute a motion profile by transposing the pixels of the lanes, road edges, or similar lines onto a motion profile 310.

For example, the video system may extract multiple frame strips associated with a focal area 308 of a video frame, form a single-pixel strip from each frame strip, and compile the single pixel strips to form the motion profile 310, in a similar manner as described above in connection with the motion profile 110. In this implementation, the system may be configured to transpose the first road edge 302 to a first location 312 in the motion profile, the second road edge 304 to a second location 314 in the motion profile, and the lane line to a third location 316 in the motion profile 310. As shown in FIG. 3, because the road edges 302, 304 may appear as diagonal lines converging toward a vanishing point in the video frame, the first location 312 and the second location 314 may be associated with a relatively wide band, in the horizontal direction, due to the horizontal components of the diagonal lines in the video frame. Similarly, because the lane line 306 may appear as a substantially vertical line in the video frame, the third location 316 may be associated with a relatively narrow band, in the horizontal direction, due to the minimal horizontal components of the substantially vertical line in the video frame. In determining a maneuver associated with a particular artifact, the video system may be configured to determine whether the particular artifact is within one of the locations 312, 314, 316 associated with the road edges and/or the lane lines, whether the particular artifact crosses one of the locations 312, 314, 316 associated with the road edges and/or the lane lines, a distance between boundaries of one of the locations 312, 314, 316 associated with the road edges and/or the lane lines and ends of the particular artifact, or similar considerations.

For example, in the implementation shown on the left side of FIG. 3, a first vehicle 318 may be parked on a right side of the road. In response to the ego vehicle overtaking the first vehicle 318 on the left, the motion profile may show a first artifact 322, which is a comma-shaped artifact originating within the second location 314 and extending toward a top of the motion profile 310 and right edge of the motion profile 310. In that regard, because the first artifact 322 originates within the second location 314 (corresponding to the second road edge 304) and/or because an end of the first artifact 322 is disposed to a right of the left boundary of the second location 314 a certain distance (shown as $x_1$), the video system may determine that the first vehicle 318 never entered the roadway and/or that the first artifact 322 corresponds to a parked vehicle on a side of the road.

However, in the implementation shown on the right side of FIG. 3, a second vehicle 320 may correspond to a vehicle traveling down the road. In response to the ego vehicle overtaking the second vehicle 320 on the left, the motion profile may show a second artifact 324, which is a comma-shaped artifact originating to a left of the second location 314 and extending toward a top of the motion profile 310 and to a right edge of the motion profile 110. In this regard, the second artifact 324 may include generally the same shape as the first artifact 322. However, unlike the first artifact 322, the second artifact 324 may originate to the left of the second location 314 (corresponding to the second road edge 304) a certain distance (shown as $x_2$), which may be indicative that the second vehicle 320 was on the road when overtaken by the ego vehicle. Accordingly, the video system may determine that, unlike the first artifact 322, the second artifact 324 corresponds to an overtake maneuver performed by the ego vehicle, which may cause different safety concerns than merely overtaking a parked car and thus which may elicit different driver feedback.

Additionally, or alternatively, the video system may be configured to distinguish the first artifact 322 from the second artifact 324 based on a distance between an end of an artifact (e.g., a beginning of the artifact, in the time domain) and a location associated with a lane line, a road edge, or a similar feature. For example, a beginning of the first artifact 322 (associated with the first vehicle 318, which may be a parked vehicle) may be located to a right of a leftmost boundary of the second location 314 a first distance, shown as $x_1$. In some implementations, this may be considered a positive offset from the leftmost boundary of the second location 314, and thus may be indicative that the first vehicle 318 never entered the roadway and thus was a parked vehicle. For example, the first distance ($x_1$) may be approximately 30 pixels, indicating that the first artifact 322 is associated with a parked vehicle. However, a beginning of the second artifact 324 (associated with the second vehicle 320, which may be a moving vehicle) may be located to a left of the leftmost boundary of the second location 314 a second distance, shown as $x_2$. In some implementations, this may be considered a negative offset from the leftmost boundary of the second location 314, and thus may be indicative that the second vehicle 320 entered the roadway and was then overtaken by the ego vehicle. For example, the second distance ($x_2$) may be approximately −90 pixels, indicating that the second artifact 324 is associated with a merging vehicle.

In some implementations, the system may determine whether an artifact is associated with a parked vehicle or a vehicle on the road based on whether the corresponding distance from a boundary of a location (e.g., the first distance, $x_1$, and the second distance, $x_2$, in FIG. 3) satisfies a threshold. For example, if a distance between an end of an artifact and a corresponding boundary is negative (as for $x_2$ in FIG. 3) or else does not satisfy a threshold (e.g., less than or equal to 10 pixels), the artifact may be determined to be associated with a vehicle on the road and thus with an overtaking maneuver performed by the ego vehicle. However, if a distance between an end of an artifact and a corresponding boundary is positive (as for $x_1$ in FIG. 3) or else satisfies a threshold (e.g., greater than 10 pixels), the artifact may be determined to be associated with a parked vehicle.

Based on determining one or more maneuvers from a motion profile, the methods and systems herein may provide increased information to drivers, fleet managers, or the like while reducing power, computing, and network resource consumption. As a result, driver feedback or similar information may be provided within a video device (e.g., a dashcam), improving real-time maneuver detection and driver safety while reducing storage requirements and other hardware requirements necessary to process high volumes of video data.

As indicated above, FIG. 3 is provided as an example. Other examples may differ from what is described with regard to FIG. 3.

Figure 4A:
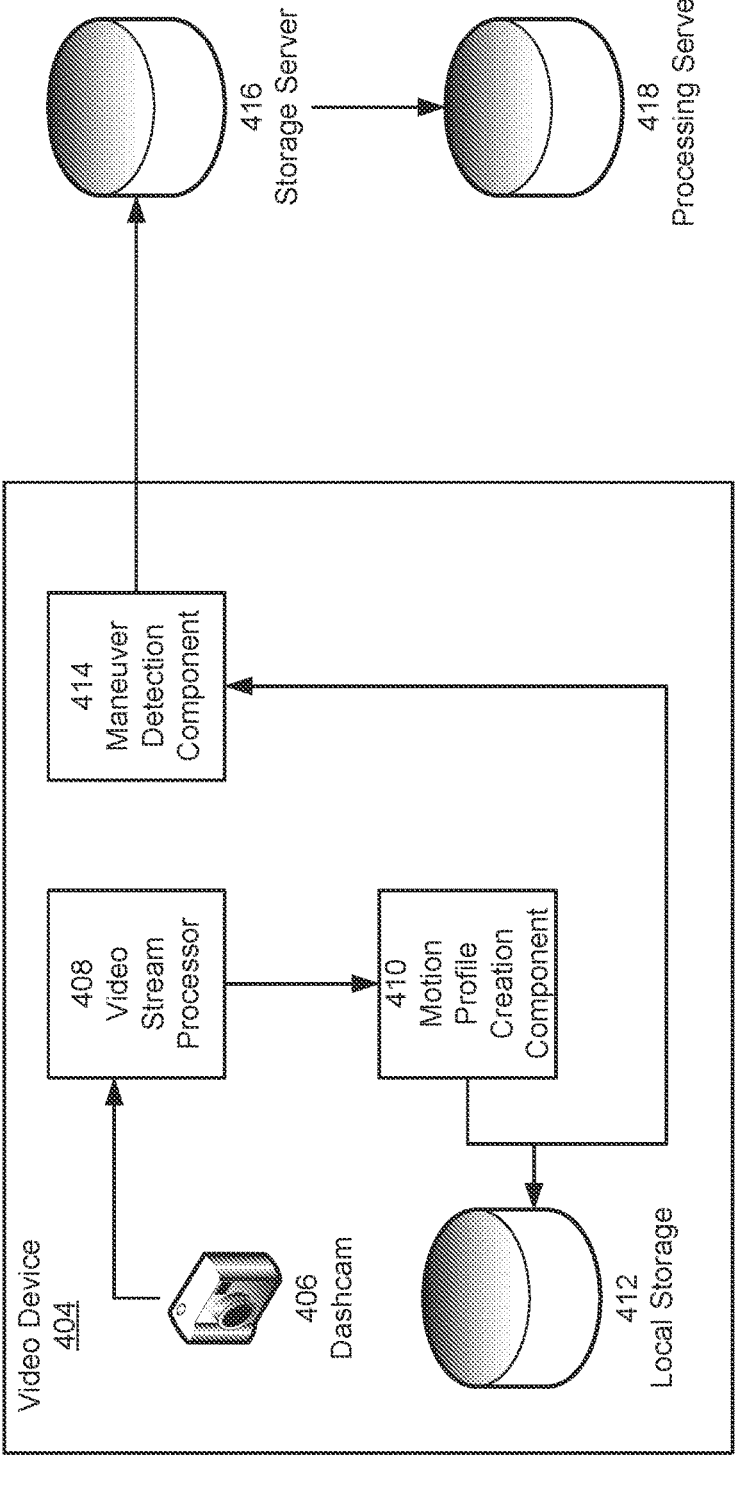
FIGS. 4A-4B are diagrams of example systems in which methods described herein may be implemented.
Figure 4B:
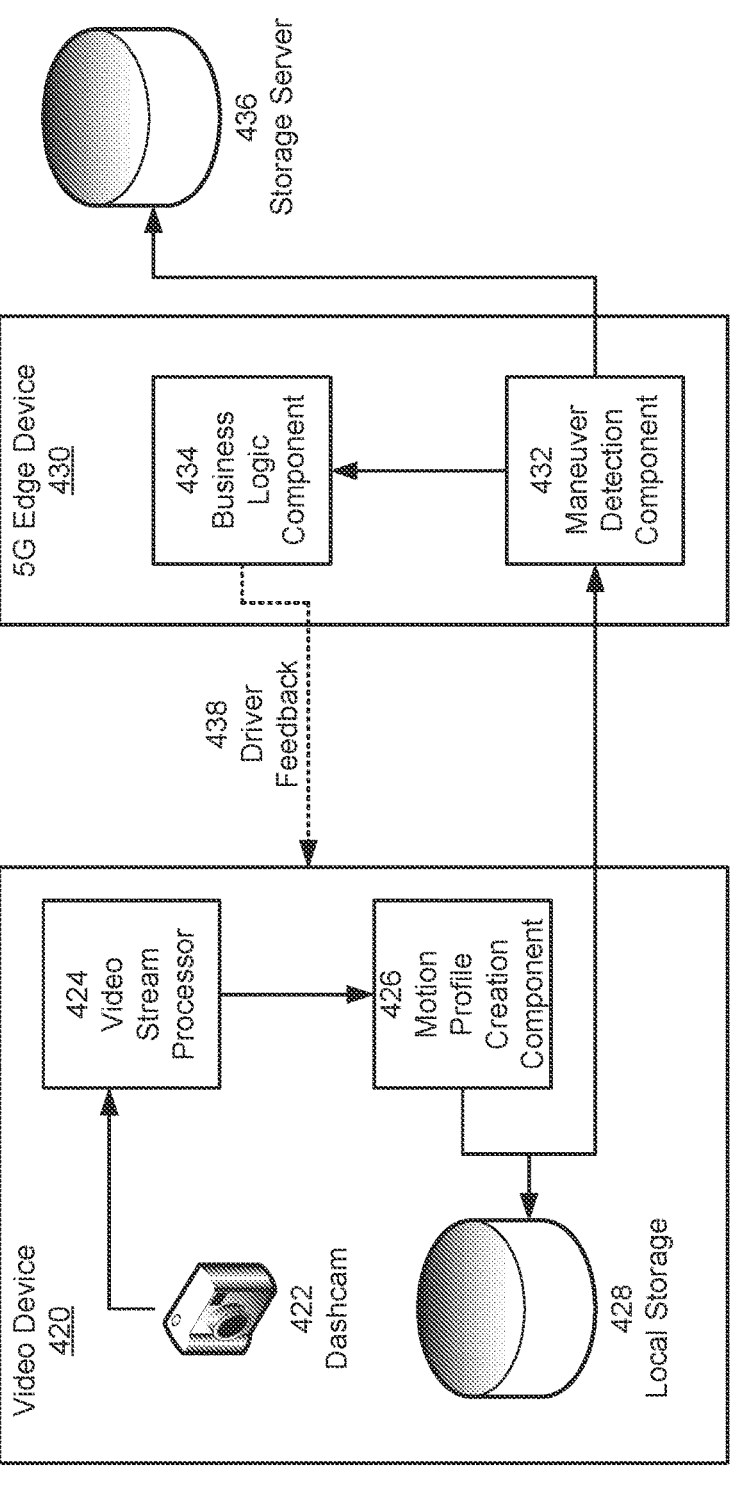

FIGS. 4A-4B are diagrams of example video systems 400, 402 in which systems and/or methods described herein may be implemented. As shown in FIG. 4A, video system 400 may include a video device 404, a dashcam 406, a video stream processor 408, a motion profile creation component 410, a local storage 412, a maneuver detection component 414, a storage server 416, and/or a processing server 418. As shown in FIG. 4B, video system 402 may include a video device 420, a dashcam 422, a video stream processor 424, a motion profile creation component 426, a local storage 428, a $5^{th}$ generation (5G) edge device 430, a maneuver detection component 432, a business logic component 434, and/or a storage server 436. Devices of video systems 400, 402 may interconnect via wired connections, wireless connections, or a combination of wired and wireless connections.

In some implementations, one or more maneuver detection processes, such as one or more of the maneuver detection processes described above in connection with FIGS. 1A-3, may be performed locally and/or onboard a video device mounted within and/or on a vehicle. For example, maneuver detection may be performed at the video device 404 shown in FIG. 4A. In some implementations, performing maneuver detection locally and/or onboard a video device mounted within and/or on a vehicle may be referred to as an in-device processing setup.

More particularly, the video device 404 may include the dashcam 406, which may be configured to capture a video of a road on which a vehicle is traveling. In some implementations, the dashcam 406 may be configured to capture a number of video frames (e.g., video frame 102) every second according to a video frame rate and/or a predetermined FPS, and/or the dashcam 406 may be configured to compile multiple video frames into a video.

The video stream processor 408 may be configured to process video data and/or video frames, such as by extracting a portion of each video frame (e.g., frame strip 106) to be used to generate a motion profile (e.g., motion profile 110) and/or by averaging RGB color values or other color values of the extracted portion in the vertical direction to thereby form a one-pixel tall strip (e.g., single-pixel strip 108). In some implementations, the video stream processor 408 may be configured to process each video frame as each frame is acquired by the dashcam to generate the compressed strip (e.g., single-pixel strip 108) for that particular frame in real-time or near real-time. In some implementations, the video stream processor 408 may be associated with video stream processing software and/or dedicated hardware configured to process video data and/or video frames as captured by the dashcam 406.

The motion profile creation component 410 may be configured to generate a motion profile (e.g., motion profile 110), such as by compiling numerous compressed strips (e.g., numerous single-pixel strips 108). In some implementations, the motion profile creation component 410 may be configured to create the motion profile by stacking compressed strips in a top-to-bottom fashion and/or in a bottom-to-top fashion. Moreover, the motion profile creation component 410 may be configured to create the motion profile in real time and/or with a fixed height, such as by continuously adding compressed strips to the motion profile and dropping outdated compressed strips from the motion profile.

The local storage 412 may be a non-volatile memory device or similar storage component configured to store video and/or non-video data. In some implementations, the local storage 412 may be configured to store raw video data, such as a video stream captured by the dashcam 406. Additionally, or alternatively, the local storage 412 may be configured to store compressed and/or processed video data, such as one or more compressed strips (e.g., frame strips 106 and/or single-pixel strips 108), one or more motion profiles (e.g., motion profile 110), or similar data. In some implementations, the local storage 412 may be a non-volatile flash memory device, such as a Secure Digital™ (SD) card or a similar storage device located inside the dashcam 406 or otherwise associated with the dashcam 406.

The maneuver detection component 414 may be configured to detect patterns in the motion profile, identify one or more artifacts in the motion profile, and/or otherwise analyze the motion profile in order to determine one or more driving maneuvers associated with the motion profile. In some implementations, the maneuver detection component 414 may be configured to periodically retrieve data from the local storage 412 (e.g., one or more motion profiles) and determine at least one maneuver associated with the retrieved data. For example, on a given temporal basis (e.g., every 5 seconds), the maneuver detection component 414 may be configured to pull the motion profile the local storage 412 or other memory and determine one or more driving maneuvers based on the retrieved motion profile. In some implementations, such as for purposes of avoiding boundary effects, the maneuver detection component 414 may be configured to fetch the motion profile from the local storage 412 or similar memory with a given overlap with a previously analyzed motion profile. Additionally, or alternatively, the maneuver detection component 414 may be configured to timestamp a motion profile and/or an indication of one or more maneuvers detected from a given motion profile, such for purposes of disambiguating multiple detections.

The storage server 416 may be a remote storage device (e.g., a non-volatile memory device) configured to store data associated with the video device 404, such as data associated with a maneuver detection algorithm associated with the video device 404 (and, more particularly, with the maneuver detection component 414 of the video device 404). In some implementations, the video device 404 and the storage server 416 may be configured to communicate with one another, such as via a wireless communication link (e.g., an access link, a fifth generation (5G) link, a wide area network (WAN) link, or a similar link).

The processing server 418 may be configured to process video data, compressed data, and/or analyzed data, such as data associated with the maneuver detection component 414. For example, the processing server 418 may be configured to retrieve data from the storage server 416 and use the data for various needs, such as in connection with a web application, as part of a risk score estimation algorithm, and/or for a similar purpose.

One or more of the components shown in FIG. 4A may be configured to provide feedback to a user of the video device 404, such as in-cabin feedback to a driver of a vehicle associated with the video device 404. In some implementations, the one or more components may be configured to provide feedback once a particular detected maneuver satisfies a threshold. For example, if the maneuver detection component 414 determines that a rate of lane changes per minute, a rate of overtake at high speed per minute, or another relevant metric exceeds a given threshold, the maneuver detection component 414 and/or another component of the video device 404 may alert the driver with audio feedback indicating that the driver should drive more safely. Additionally, or alternatively, if an illegal maneuver, driving violation, or otherwise dangerous maneuver is detected by the maneuver detection component 414, or if a number of illegal maneuvers and/or driving violations detected in a given timeframe exceeds a threshold, the maneuver detection component 414 and/or another component of the video device 404 may alert the driver with audio feedback indicating that the driver should cease the illegal maneuver and/or drive more safely.

In some other implementations, one or more maneuver detection processes, such one or more of the maneuver detection processes described above in connection with FIGS. 1A-3, may be performed remotely and/or externally to a video device mounted on a vehicle. For example, one or more maneuver detection processes may be performed by 5G5G edge node device or a similar network node and/or device. In such implementations, hardware required to perform maneuver detection (e.g., a graphics processing unit (GPU) and/or a relatively high-powered central processing unit (CPU)) does not need to be present on the dashcam, making the dashcam less expensive and/or less complex.

For example, FIG. 4B shows the video system 402, which may be employed when one or more of the maneuver detection processes are performed remotely and/or externally to a video device mounted on a vehicle. The video device 420 in this example may include the dashcam 422, the video stream processor 424, the motion profile creation component 426, and/or the local storage 428, which may be configured in a substantially similar manner as the like-named components described above in connection with FIG. 4A (e.g., the dashcam 406, the video stream processor 408, the motion profile creation component 410, and/or the local storage 412).

In this implementation, however, maneuver detection may be performed at 5Ge 5G edge device 430 (e.5G, a 5G edge node) or a similar network device. In that regard, the maneuver detection component 432 (which may be configured in a substantially similar manner as the maneuver detection component 414 described above in connection with FIG. 4A) may be located at, or otherwise associated wi5G, the 5G edge device 430. In some implementations, the maneuver detection component 432 may be configured to periodically retrieve one or more motion profiles from the video device 420 (e.g., from the local storage 428 associated with the video device 420) and detect one or more maneuvers therefrom. For example, the motion profile may be periodically transferr5G to the 5G edge device 430 via a wireless communication li5G (e.g., a 5G link), such as once every five seconds.

Additionally, or alternatively, the maneuver detection component 432 may transmit processed data to one or more components associ5Ged with the 5G edge device 430 and/or located re5Gtely from the 5G edge device 430. For example, the video system 402 may include the storage server 436 (e.g., a non-volatile memory device), which may function in a substantially similar manner to the storage server 416 described above in connection with FIG. 4A. In such implementations, the maneuver detection component 432 may be configured to transmit data associated with the video device 420, such as via a wireless communicat5Gn link (e.g., a 5G link). Additionally, or alternatively, the maneuver detection component 432 may be configured to transmit data associated with the video device 420 to another component 5Gsociated with the 5G edge device 430, such as the business logic component 434.

The business logic component 434 may be configured to perform one or more actions based on the maneuvers detected by the maneuver detection component 432. For example, the business logic component 434 may be configured to process detection results of the maneuver detection component 432 and/or determine if driver feedback is required. In some implementations, the business logic component 434 may be configured to provide the driver with audio feedback indicating that the driver should cease the illegal maneuver and/or drive more safely, as indicated by reference number 438. The business logic component 434 may be configured to use data obtained from the maneuver detection component 432 for various other needs, such as in connection with a web application, as part of a risk score estimation algorithm, and/or for a similar purpose.

The number and arrangement of devices and networks shown in FIGS. 4A-4B are provided as an example. In practice, there may be additional devices and/or networks, fewer devices and/or networks, different devices and/or networks, or differently arranged devices and/or networks than those shown in FIGS. 4A-4B. Furthermore, two or more devices shown in FIGS. 4A-4B may be implemented within a single device, or a single device shown in FIGS. 4A-4B may be implemented as multiple, distributed devices. Additionally, or alternatively, a set of devices (e.g., one or more devices) of video systems 400, 402 may perform one or more functions described as being performed by another set of devices of video systems 400, 402.

Figure 5:
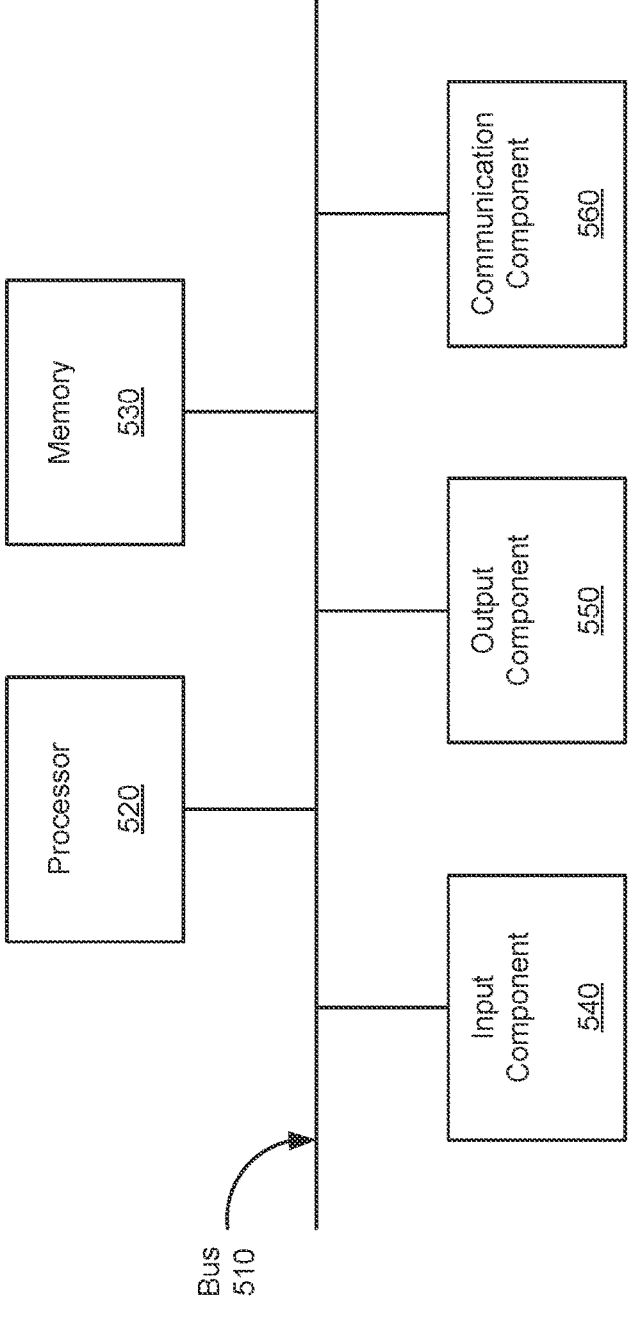
FIG. 5 is a diagram of example components of a device associated with maneuvers identification from a condensed representation of a video into an image.

FIG. 5 is a diagram of example components of a device 500 associated with maneuvers identification from a condensed representation of a video into an image. The device 500 may correspond to the video system 400, the video system 402, the video device 404, the dashcam 406, the video stream processor 408, the motion profile creation component 410, the local storage 412, the maneuver detection component 414, the storage server 416, the processing server 418, the video device 420, the dashcam 422, the video stream processor 424, the motion profile creation component 426, the 15Gal storage 428, the 5G edge device 430, the maneuver detection component 432, the business logic component 434, and/or the storage server 436. In some implementations, the video system 400, the video system 402, the video device 404, the dashcam 406, the video stream processor 408, the motion profile creation component 410, the local storage 412, the maneuver detection component 414, the storage server 416, the processing server 418, the video device 420, the dashcam 422, the video stream processor 424, the motion profile creation component 426, the5Gocal storage 428, the 5G edge device 430, the maneuver detection component 432, the business logic component 434, and/or the storage server 436 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hard-wired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

FIG. 6 is a flowchart of an example process 600 associated with maneuvers identification from a condensed representation of a video into an image. In some implementations, one or more process blocks of FIG. 6 may be performed by a video system (e.g., video system 400, 402). In some implementations, one or more process blocks of FIG. 6 may be performed by another device or a group of devices separate from or including the video system, such as a video device (e.g., video device 404, 420), a dashcam (e.g., dashcam 406, 422) a video stream processor (e.g., video stream processor 408, 424), a motion profile creation component (e.g., motion profile creation component 410, 426), a local storage (e.g., local storage 412, 428), a maneuver detection component (e.g., maneuver detection component 414, 432), a storage server (e.g., storage server 416, 436), a processing server (e.g., 5Gocessing server 418), a 5G edge device (e.g., 5G edge device 430), and/or a business logic component (e.g., the business logic component 434). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving, from a camera mounted to a vehicle, a video of a portion of a road on which the vehicle is traveling (block 610). For example, the video system may receive, from a camera mounted to a vehicle, a video of a portion of a road on which the vehicle is traveling, as described above.

As further shown in FIG. 6, process 600 may include extracting, from each frame of a plurality of frames associated with the video of the road, a frame strip to form a plurality of frame strips, wherein each frame strip, of the plurality of frame strips, extends a predetermined width in a horizontal direction and a predetermined height in a vertical direction (block 620). For example, the video system may extract, from each frame of a plurality of frames associated with the video of the road, a frame strip to form a plurality of frame strips, wherein each frame strip, of the plurality of frame strips, extends a predetermined width in a horizontal direction and a predetermined height in a vertical direction, as described above. In some implementations, each frame strip extends an entire width of a corresponding frame in the horizontal direction and a fixed number of pixels in the vertical direction. For example, the fixed number of pixels may be 20 pixels.

As further shown in FIG. 6, process 600 may include forming, from each frame strip, a single-pixel strip, to form a plurality of single-pixel strips (block 630). For example, the video system may form, from each frame strip, a single-pixel strip, to form a plurality of single-pixel strips, as described above. In some implementations, each single-pixel strip, of the plurality of single-pixel strips, is formed by averaging, at each of a plurality of pixel locations in the horizontal direction, RGB color values associated with pixels in the vertical direction.

As further shown in FIG. 6, process 600 may include compiling the plurality of single-pixel strips to form a motion profile (block 640). For example, the video system may compile the plurality of single-pixel strips to form a motion profile, as described above.

As further shown in FIG. 6, process 600 may include determining, using machine learning, one of: at least one driving maneuver associated with the vehicle based on the motion profile, or that no driving maneuvers are present in the motion profile (block 650). For example, the video system may determine, using machine learning, one of: at least one driving maneuver associated with the vehicle based on the motion profile, or that no driving maneuvers are present in the motion profile, as described above. In some implementations, the machine learning may be associated with at least one of a you only look once algorithm or a convolution neural network. Moreover, determining the at least one driving maneuver associated with the vehicle may include determining at least one of an overtake maneuver performed by another vehicle, a cut-in maneuver performed by another vehicle, a lane change maneuver performed by the vehicle, or an overtake maneuver performed by the vehicle. Additionally, or alternatively, process 600 may include determining multiple patterns within the motion profile that are associated with multiple driving maneuvers associated with the vehicle. For example, determining the multiple patterns within the motion profile may be performed using machine learning. Moreover, the machine learning may be associated with at least one of random color jittering of the motion profile, vertical random cropping of the motion profile, random resizing of the motion profile, or random horizontal flipping of the motion profile. In some implementations, process 600 includes determining one or more locations within the motion profile that are associated with one or more edges of the road, wherein determining the at least one driving maneuver is further based on the one or more locations within the motion profile that are associated with the one or more edges of the road. Moreover, process 600 may include providing driver feedback based on determining the at least one driving maneuver.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, from a camera mounted to a vehicle, a video of
      a portion of a road on which the vehicle is traveling;

extracting, from each frame of a plurality of frames associated with the video of the portion of the road, a frame strip to form a plurality of frame strips, wherein each frame strip, of the plurality of frame strips, extends a predetermined width in a horizontal direction and a predetermined height in a vertical direction;

forming, from each frame strip, a single-pixel strip, to form a plurality of single-pixel strips, wherein each single-pixel strip, of the plurality of single-pixel strips, is formed by averaging, at each of a plurality of pixel locations in the horizontal direction, color values associated with pixels in the vertical direction;

compiling the plurality of single-pixel strips to form a motion profile;

transposing pixels of one or more lane lines in a frame, of the plurality of frames, onto the motion profile;

detecting one or more artifacts within a location on the motion profile associated with the one or more lane lines; and determining at least one driving maneuver associated with the vehicle, wherein the at least one driving maneuver is determined based on each of the one or more artifacts in the motion profile, wherein determining the at least one driving maneuver associated with the vehicle includes determining at least one of:

a cut-in maneuver performed by another vehicle, or a lane change maneuver performed by the vehicle.

2. The method of claim 1, wherein each frame strip extends an entire width of a corresponding frame in the horizontal direction and a fixed number of pixels in the vertical direction.

3. The method of claim 1, further comprising:

identifying the one or more artifacts using at least one of a you only look once algorithm or a convolution neural network.

4. The method of claim 1, wherein determining the at least one driving maneuver associated with the vehicle further includes determining at least one of:

a cut-in maneuver performed by another vehicle, or a lane change maneuver performed by the vehicle.

5. The method of claim 3, wherein identifying the one or more artifacts comprises identifying multiple artifacts within the motion profile that are associated with multiple driving maneuvers associated with the vehicle.

6. The method of claim 1, wherein the at least one driving maneuver comprises multiple different driving maneuvers.

7. The method of claim 3, wherein the at least one of the you only look once algorithm or the convolutional neural network is associated with at least one of:

random color jittering of the motion profile, vertical random cropping of the motion profile, random resizing of the motion profile, or random horizontal flipping of the motion profile.

8. The method of claim 1, further comprising determining one or more locations within the motion profile that are associated with one or more edges of the road, wherein determining the at least one driving maneuver is further based on the one or more locations within the motion profile that are associated with the one or more edges of the road.

9. The method of claim 1, further comprising providing driver feedback based on determining the at least one driving maneuver.

10. A video device, comprising:

one or more processors configured to:

record, using a camera associated with the video device and mounted to a vehicle, a video of a portion of a road on which the vehicle is traveling;

extract, from each frame of a plurality of frames associated with the video of the portion of the road, a frame strip to form a plurality of frame strips, wherein each frame strip, of the plurality of frame strips, extends a width of a corresponding frame in a horizontal direction and a fixed number of pixels in a vertical direction;

form, from each frame strip, a single-pixel strip to form a plurality of single-pixel strips by averaging, at each of a plurality of pixel locations in the horizontal direction, red, green, and blue color values associated with pixels in the vertical direction;

compile the plurality of single-pixel strips to form a motion profile;

transpose pixels of one or more lane lines in a frame, of the plurality of frames, onto the motion profile;

detect one or more artifacts within a location associated with the one or more lane lines; and determine at least one driving maneuver associated with the vehicle, wherein the at least one driving maneuver is determined based on the one or more artifacts in the motion profile, and wherein determining the at least one driving maneuver associated with the vehicle includes determining at a lane change maneuver performed by the vehicle.

11. The video device of claim 10, wherein the one or more processors are further configured to determine at least one of:

an overtake maneuver performed by another vehicle, a cut-in maneuver performed by another vehicle, or an overtake maneuver performed by the vehicle.

12. The video device of claim 10, wherein the one or more artifacts include multiple artifacts that are associated with multiple driving maneuvers associated with the vehicle.

13. The video device of claim 10, wherein the one or more processors are further configured to:

determine one or more locations within the motion profile that are associated with one or more edges of the road, wherein determining the at least one driving maneuver associated with the vehicle is further based on the one or more locations within the motion profile that are associated with the one or more edges of the road.

14. The video device of claim 10, wherein the one or more processors are further configured to:

provide driver feedback based on determining the at least one driving maneuver.

15. A non-transitory computer-readable medium storing a set of instructions, the set of instructions comprising:

one or more instructions that, when executed by one or more processors of a video device, cause the video device to:

extract, from each video frame of a plurality of video frames associated with the video of a portion of a road, a frame strip, wherein each one-pixel-tall horizontal strip, of a plurality of one-pixel-tall horizontal strips, is formed by averaging, at each of a plurality of pixel locations in a horizontal direction of a corresponding frame strip, color values associated with pixels in a vertical direction;

compile a motion profile associated with the video of the portion of the road on which a vehicle associated with the video device is traveling, wherein the motion profile includes the plurality of one-pixel-tall horizontal strips, and wherein each one of the one-pixel-tall horizontal strips corresponds to a different video frame of the video of the portion of the road;

transpose pixels of one or more lane lines in a video frame onto the motion profile;

detect one or more artifacts within a location associated with the one or more lane lines;

determine at least one driving maneuver associated with the vehicle, wherein the at least one driving maneuver is determined based on the one or more artifacts in the motion profile, and wherein the one or more instructions further cause the video device to determine at least one of:

a cut-in maneuver performed by another vehicle, or a lane change maneuver performed by the vehicle; and provide feedback to a driver of the vehicle based on determining the at least one driving maneuver satisfies a threshold.

16. The non-transitory computer-readable medium of claim 15, wherein the one or more instructions further cause the video device to further determine at least one of:

an overtake maneuver performed by another vehicle, or an overtake maneuver performed by the vehicle.

17. The non-transitory computer-readable medium of claim 15, wherein the one or more artifacts include multiple artifacts that are associated with multiple driving maneuvers associated with the vehicle.

18. The non-transitory computer-readable medium of claim 15, wherein the one or more instructions further cause the video device to determine one or more locations within the motion profile that are associated with one or more edges of the road, wherein determining the at least one driving maneuver associated with the vehicle is further based on the one or more locations within the motion profile that are associated with the one or more edges of the road.

* * * * *